(12) United States Patent
Wei et al.

(10) Patent No.: US 8,467,434 B2
(45) Date of Patent: *Jun. 18, 2013

(54) GNSS RECEIVER AND METHOD FOR GNSS MEMORY CODE GENERATION

(75) Inventors: Jui-Ming Wei, Taichung (TW); Chun-Nan Chen, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/163,163

(22) Filed: Jun. 17, 2011

(65) Prior Publication Data

US 2011/0243199 A1    Oct. 6, 2011

Related U.S. Application Data

(63) Continuation of application No. 12/025,076, filed on Feb. 4, 2008, now Pat. No. 7,991,042.

(51) Int. Cl.
*H04B 1/707* (2011.01)

(52) U.S. Cl.
USPC .......................................................... 375/150

(58) Field of Classification Search
USPC .......................................... 375/142, 147, 159
See application file for complete search history.

(56) References Cited

U.S. PATENT DOCUMENTS

| | | |
|---|---|---|
| 5,903,595 A | 5/1999 | Suzuki |
| 6,804,290 B1 | 10/2004 | King et al. |
| 7,683,830 B2 | 3/2010 | Montgomery et al. |
| 2003/0202565 A1 | 10/2003 | Li et al. |
| 2006/0165283 A1 | 7/2006 | De Witt et al. |
| 2007/0274374 A1 | 11/2007 | Abraham |

FOREIGN PATENT DOCUMENTS

| | | |
|---|---|---|
| TW | 448304 | 8/2001 |
| TW | 200705838 | 2/2007 |
| TW | 200736581 | 10/2007 |
| TW | 200814651 | 3/2008 |
| TW | 200815781 | 4/2008 |
| WO | WO 2007/101454 | 9/2007 |

OTHER PUBLICATIONS

English Abstract translation of TW 200705838 (Published Feb. 1, 2007).
English Abstract translation of TW 200736581 (Published Oct. 1, 2007).
English Abstract translation of TW 200814651 (Published Mar. 16, 2008).
English Abstract translation of TW 200815781 (Published Apr. 1, 2008).
English Abstract translation of TW 448304 (Published Aug. 1, 2001).

*Primary Examiner* — Kevin Kim
(74) *Attorney, Agent, or Firm* — McClure, Qualey & Rodack, LLP (57) ABSTRACT

A GNSS receiver and method for GNSS memory code generation are disclosed. The GNSS receiver comprises a buffer, a correlator, and a selector. The buffer receives and stores a plurality of first code segments. Each of the first code segment is at least a portion of a memory code. The selector selects a selecting window of the first code segments stored in the buffer as a second code segment according to the code phase selection signal. The correlator calculates a correlation between a received GNSS signal and the second code segment.

13 Claims, 10 Drawing Sheets

| Channel | Period (ms) | Size(chips) Primary | Size(chips) Secondary | NAV | Data Rate (sps) | PRN Code Type | Chip Rate (×1.023MHz) |
|---|---|---|---|---|---|---|---|
| E1-B | 4 | 4092 (4ms) | N/A | I/NAV | 250 | Memory Code | 1 |
| E1-C | 100 | 4092 (4ms) | 25 | N/A | N/A | Memory Code | 1 |

GNSS RECEIVER AND METHOD FOR GNSS MEMORY CODE GENERATION

CROSS REFERENCE

This application is a Continuation of U.S. patent application Ser. No. 12/025,076, filed Feb. 4, 2008, now U.S. Pat. No. 7,991,042, and the subject matter of which is incorporated herein by its entirety.

BACKGROUND OF THE INVENTION

1. Field of the Invention

The invention relates to Global Navigation Satellite System (GNSS) receivers, and more particularly to memory code generation for GNSS receivers.

2. Description of the Related Art

A Global Navigation Satellite System (GNSS) comprises a GNSS transmitter and a GNSS receiver. A GNSS transmitter modulates a signal with a modulating code before the signal is transmitted. After a GNSS receiver receives the transmitted signal through a radio frequency module, the GNSS receiver must demodulate the received signal with the modulating code before the received signal is further processed. In one embodiment, the modulating code is a series of pseudo random numbers (PRN). The code phase of the modulating code of the GNSS receiver, however, must be synchronized with the code phase of the modulating code of the GNSS transmitter before signal demodulation is performed. A method for synchronizing the codes phases is to calculate a correlation between a received GNSS signal with a modulating code having different code phases. The maximum correlation corresponds to the modulating code with the code phase identical with that of the GNSS transmitter. Thus, the GNSS receiver must calculate a correlation between the received GNSS signal and a demodulating code for code phase synchronization and signal demodulation.

Figure 1:
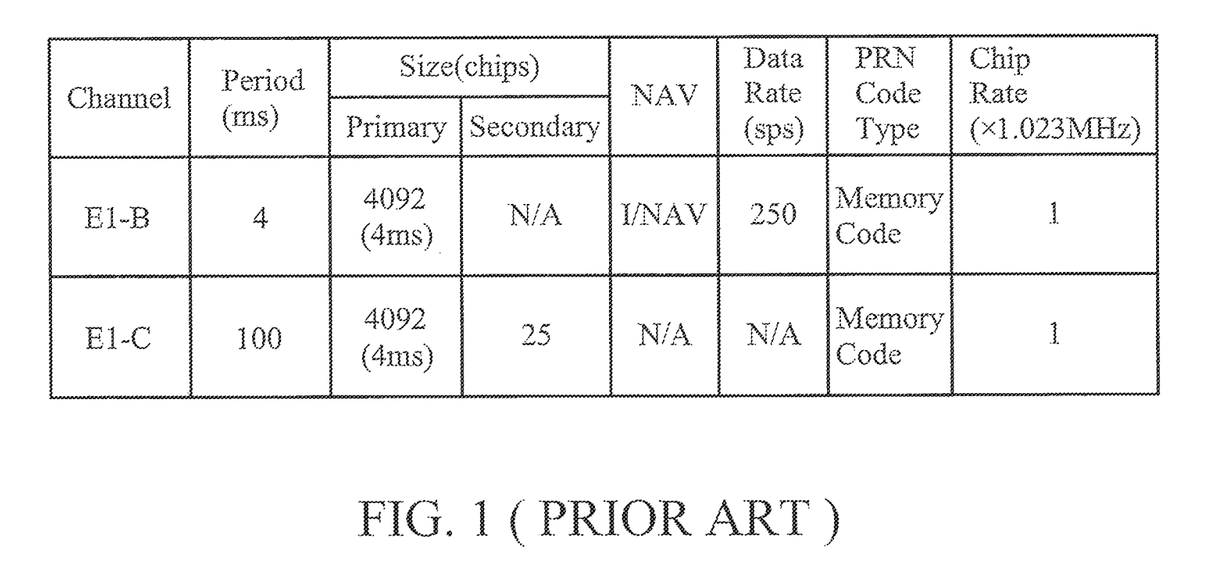
FIG. 1 shows a table listing signal bands of a Galileo system and attributes of the PSN codes corresponding to the signal bands.

Both Global Positioning Systems (GPS) and Galileo systems are referred to as one of GNSS systems. The modulating codes of GPS systems and Galileo systems are both pseudo-random-number (PRN) codes. The modulating code of a GPS system is a 1023-chip gold code which can be generated by a 10-bit linear feedback shift register. The modulating code of a Galileo system, however, is a memory code which cannot be mathematically generated and has a longer chip size of 4092 chips than that of the GPS system. Referring to FIG. 1, a table listing signal bands of a Galileo system and attributes of the PSN codes corresponding to the signal bands is shown. Both the E1-B channel and the E1-C channel have memory codes with a chip size of 4092 chips. Thus, a Galileo receiver must store the demodulating code in a memory to provide the demodulating code as a source for signal correlation and demodulation.

Figure 2:
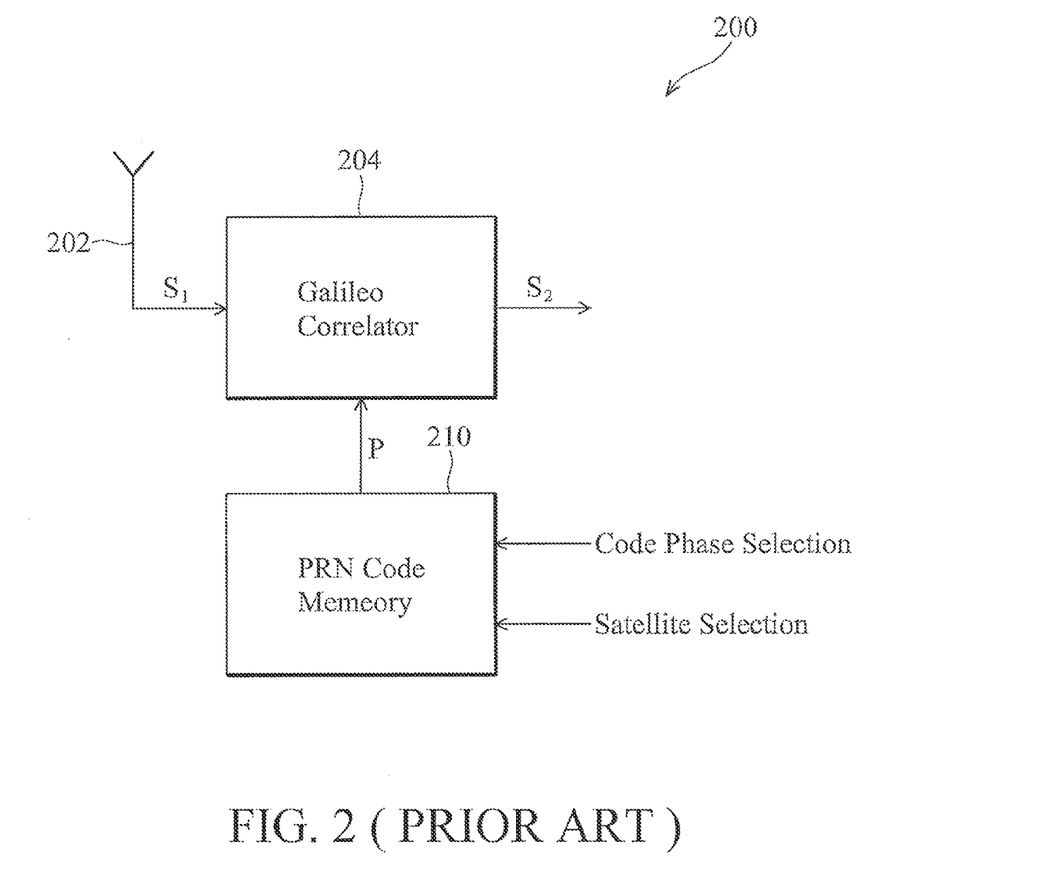
FIG. 2 is a block diagram of a portion of a conventional Galileo receiver.

Referring to FIG. 2, a block diagram of a portion of a conventional Galileo receiver 200 is shown. The Galileo receiver 200 comprises a radio frequency module 202, a Galileo correlator 204, and a PRN code memory 210. The radio frequency module 202 receives a Galileo signal $S_1$ from a Galileo satellite through the air. The PRN code memory 210 stores multiple PRN codes, wherein each PRN code corresponds to a specific Galileo satellite. To provide a PRN code for correlation, the PRN code memory first selects the PRN code corresponding to the satellite transmitting the Galileo signal $S_1$ according to a satellite selection signal. The PRN code memory 210 then outputs the PRN code P with the code phase required by a code phase selection signal to a Galileo correlator 204. The Galileo correlator 204 then calculate the correlation value $S_2$ between the received Galileo signal $S_1$ and the PRN code P. The code phase selection signal continues to shift the code phase of the PRN code P provided by the PRN code memory 210. The code phase corresponding to a maximum correlation value $S_2$ is the code phase of the Galileo satellite transmitting the Galileo signal $S_1$, and signal synchronization is achieved.

A data output bandwidth of a memory indicates how many bits of data is output by the memory during a predetermined period and is equal to a product of an output data width and a data output frequency. The output data width refers to the number of bits of data together output by the memory. The data output frequency refers to the highest frequency in which the memory outputs data. A correlation data length refers to the data length of two correlated signals. When the Galileo correlator 210 calculates a partial correlation $S_2$ with a correlation data length, the output data width of the PRN code memory 210, however, is not always equal to the correlation data length, which determines the correlation efficiency. In addition, the data output frequency of the PRN code memory 210 often does not coincide with the correlation speed of the Galileo correlator 204. Thus, an interface must be provided to buffer the PRN code P between the PRN code memory 210 and the Galileo correlator 204.

SUMMARY OF THE INVENTION

The invention provides a Global Navigation Satellite System (GNSS) receiver. In one embodiment, the GNSS receiver comprises a buffer, a correlator, and a selector. The buffer receives and stores a plurality of first code segments, each of the first code segments is at least a portion of a memory code. The selector selects a selecting window of the first code segments stored in the buffer as a second code segment according to the code phase selection signal. The correlator calculates a correlation between a received GNSS signal and the second code segment.

The invention also provides a method for memory code generation for a Global Navigation Satellite System (GNSS) receiver. A portion of the memory code is received as a first code segment. A plurality of the first code segments are then stored into a buffer. A selecting window of the first code segments stored in the buffer is then selected as a second code segment according to a code phase selection signal. The correlator then calculates a correlation between a received GNSS signal and the second code segment.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 3:
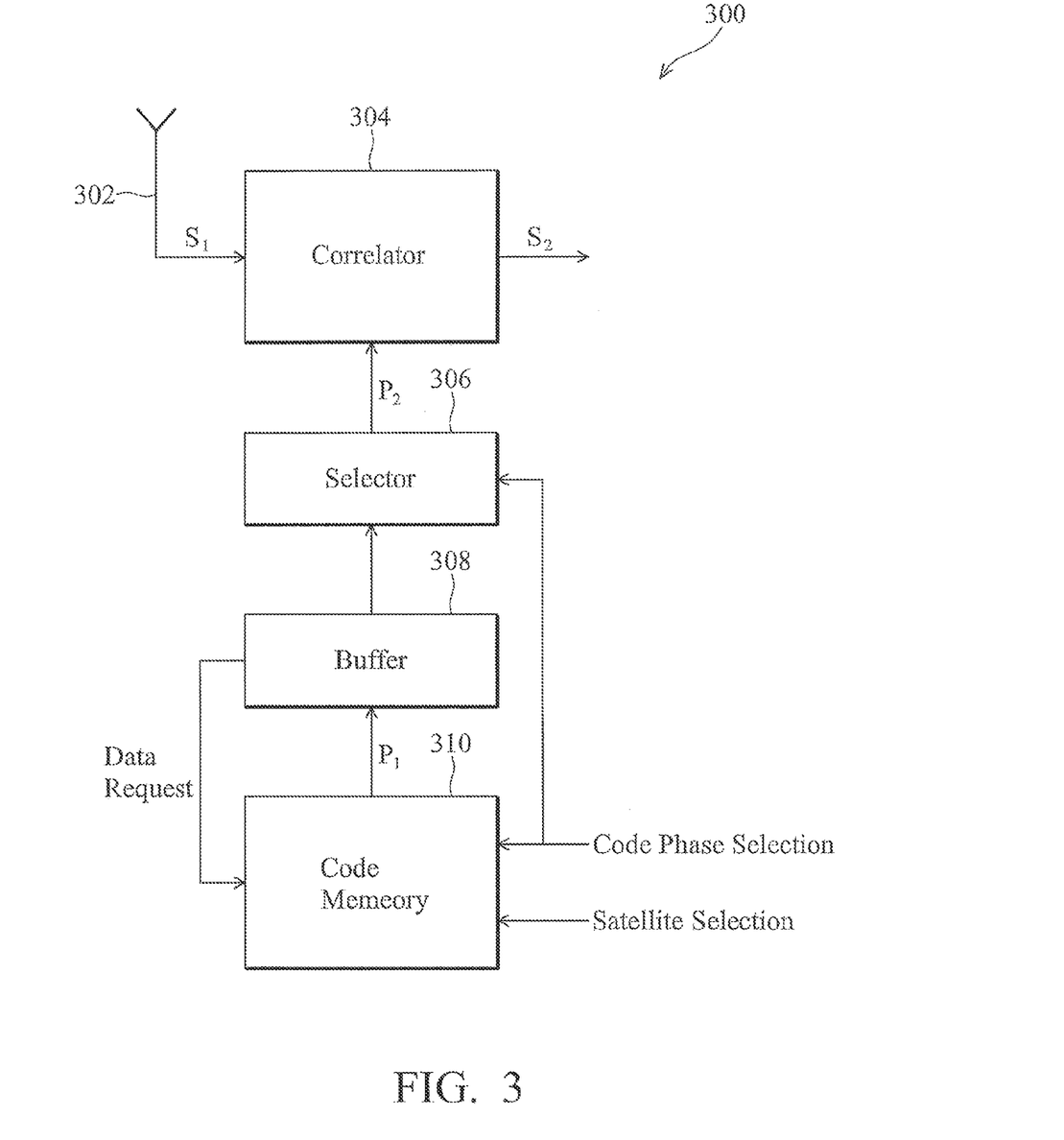
FIG. 3 is a block diagram of a portion of a GNSS receiver 300 according to the invention.

Referring to FIG. 3, a block diagram of a portion of a GNSS receiver 300 according to the invention is shown. In one embodiment, the GNSS receiver 300 is a Galileo receiver. The GNSS receiver 300 comprises a radio frequency module 302, a correlator 304, a selector 306, a buffer 308, and a code memory 310. The radio frequency module 302 receives a GNSS signal $S_1$ from a GNSS satellite through the air. The code memory 310 stores multiple codes for correlation, wherein each code corresponds to a specific GNSS satellite. In one embodiment, the codes are pseudo-random-number (PRN) codes. The code memory 310 first selects a code corresponding to the GNSS satellite transmitting the signal $S_1$ according to a code phase selection signal. The code memory 310 then selects a portion of the selected code with specific code phase corresponding to a code phase selection signal. Every time the code memory 310 receives a data request, the code memory 310 then outputs the selected portion of the memory code according to the code phase selection signal as a first code segment $P_1$ with an output data width.

The buffer 308 comprises a plurality of component buffers. Every component buffer of the buffer 308 has a buffer size equal to the output data width and can therefore exactly store a first code segment $P_1$. In one embodiment, the buffer 308 is a Read-Only Memory (ROM), a Static Random Access Memory (SRAM), or a flash memory. When the code memory 310 outputs a first code segment $P_1$, the buffer 308 stores the first code segment $P_1$ into one of the component buffers in order. Thus, when the buffer 308 is full, a plurality of first code segments $P_1$ are stored in the buffer 308.

The selector 306 then selects a portion of the first code segments stored in the buffer 308 as a second code segment $P_2$ according to the code phase selection signal and delivers the second code segment $P_2$ to the correlator 304. The data length of the second code segment $P_2$ selected by the selector 306 is equal to a correlation data length of the correlator 304. In one embodiment, the selector 306 determines a location of a selecting window according to the code phase selection signal, and then selects the second code segment $P_2$ from the first code segments $P_1$ stored in the buffer 308 according to the selecting window, wherein a window size of the selecting window is equal to the correlation data length. The correlator 304 then calculates a correlation $S_2$ between the received GNSS signal $S_1$ with the correlation data length and the second code segment $P_2$. In one embodiment, the correlation $S_2$ calculated by the correlator 304 is a partial correlation. Because the data lengths of the GNSS signal $S_1$ and the second code segment $P_2$ are equal, the correlator 304 can smoothly calculate the correlation value $S_2$.

Figure 4:
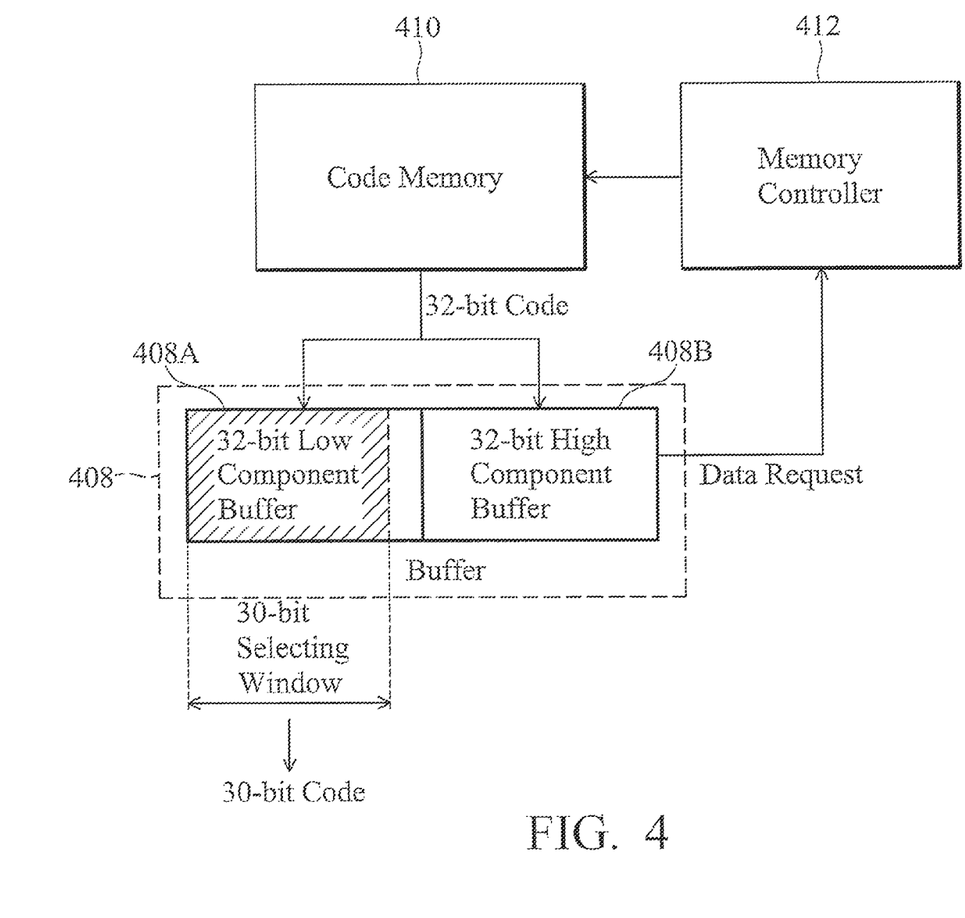
FIG. 4 shows an embodiment of interactions between a buffer and a code memory according to the invention.

Referring to FIG. 4, an embodiment of interactions between a buffer 408 and a code memory 410 according the invention is shown. The code memory 410 has an output data width of 32 bits. The buffer 408 comprises two component buffers 408A and 408B, and each component buffer has a buffer size of 32 bits. Assuming that a correlator has a correlator data length of 30 bits, and a selector has a selecting window with the same window size as the correlation data length. The selector would continue to output the data bits selected by the selecting window from the buffer 408 and then shift the selecting window. When the selecting window is shifted off one of the component buffers 408A and 408B, the data bits stored in the component buffer would have been output to the correlator and be useless. The component buffer shifted off by the selecting window therefore requires updating. Thus, the buffer 408 sends a data request to a memory controller 412 of the code memory 410, and the memory controller 412 then controls the code memory 412 to output a 32-bit code segment. Because the component buffer 408A or 408B requiring updating has a buffer size of 32 bits, the 32-bit code segment can exactly fill in the component buffer 408A or 408B.

Figure 5:
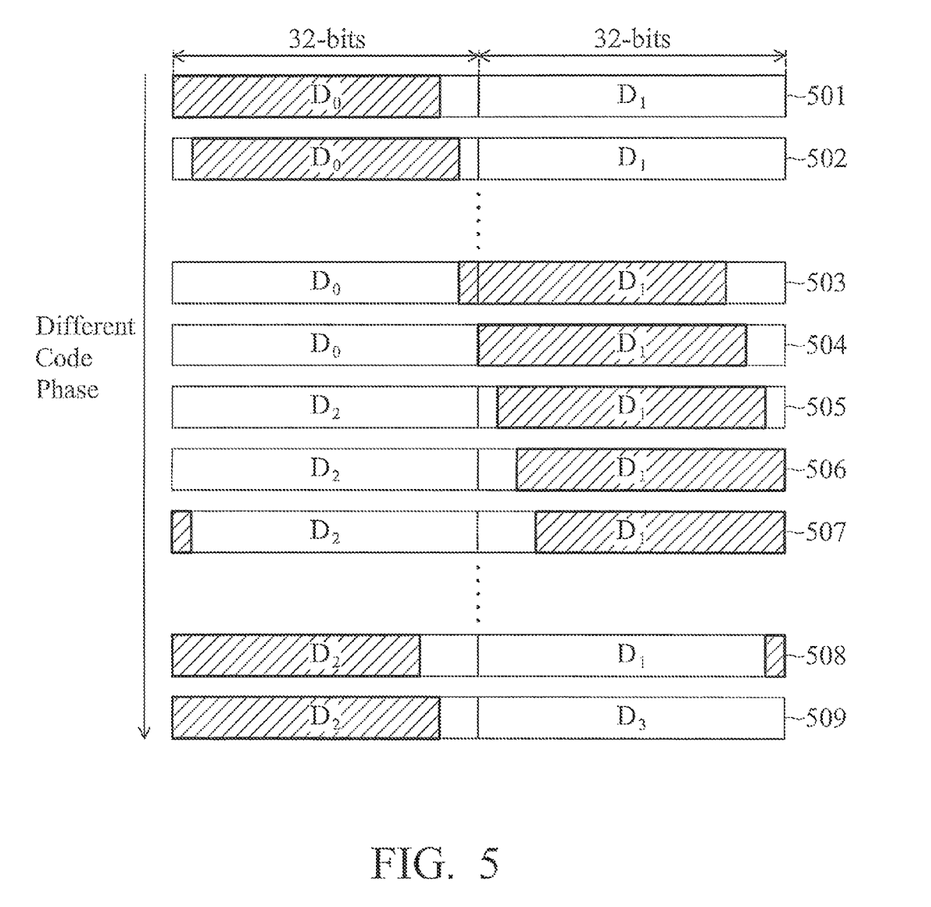
FIG. 5 is a schematic diagram showing data updating of the buffer of FIG. 4 according to the invention.

Referring to FIG. 5, a schematic diagram showing data updating of the buffer of FIG. 4 according to the invention. At a first stage 501, the 32-bit low component buffer 408A stores a code segment $D_0$, and the 32-bit high component buffer 408B stores a code segment $D_1$. A 30-bit selecting window selects the first 30 bits of data stored in the low component buffer 408A as an output code delivered to a correlator. Every time after a selector outputs the code selected by the selecting window to the correlator, a code phase of the code segment output to the correlator changes, and the selector shifts the selecting window for 1-bit length according to a code phase selection signal. The code phase selection signal is controlled by a physical circuit or a software program. Thus, the selecting window is gradually shifted from left to right through the stages 502 to 503.

At the stage 504, the selecting window just shifts off the low component buffer 408A. The code segment $D_0$ stored in the low component buffer 408A has been output to the correlator and is useless. The low component buffer 408A therefore requires updating, and the buffer 408 generates a data request to the memory controller 412 to direct the code memory 410 to output a new code segment $D_2$. Thus, at the stage 505, the low component buffer 408A is updated with the new code segment $D_2$. The selecting window continues to shift to the right. Accordingly, the selecting window shifts off the high component buffer 408B at the stage 508, and the high component buffer 408B is updated with a new code segment $D_3$ at the stage 509.

Figure 6:
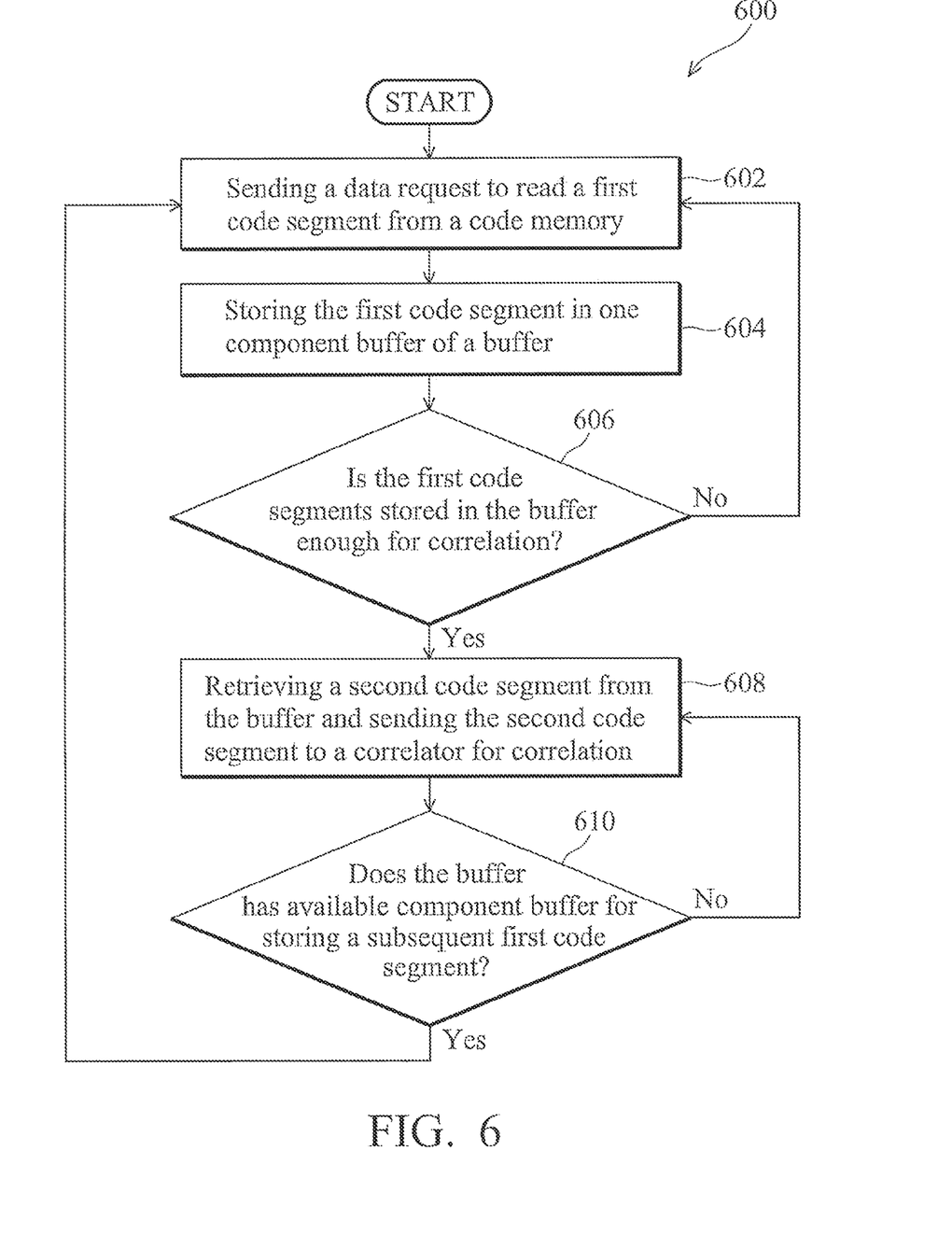
FIG. 6 is a flowchart of method for memory code generation for a GNSS receiver according to the invention.

Referring to FIG. 6, a flowchart of method 600 for memory code generation for a GNSS receiver according to the invention is shown. First, the buffer 308 sends a data request to read a first code segment $P_1$ from the code memory 310 at step 602. The buffer 308 then stores the first code segment $P_1$ at step 604. The selector 306 then determines whether the code segments $P_1$ stored in the buffer 308 are enough for correlation at step 606. If the code segments $P_1$ stored in the buffer 308 are enough for correlation, the selector 306 then retrieves a second code segment $P_2$ from the buffer 308 and sends the second code segment $P_2$ to a correlator 304 for correlation at step 608. After the second code segment P2 is output to the correlator 304, the buffer 308 checks whether it has an available component buffer for storing a subsequent first code segment $P_1$ at step 610. If so, the buffer 308 sends a data request to the code memory 310 for a subsequent first code segment $P_1$ at step 602. Otherwise, the buffer 308 requires no updating and the selector 306 continues to retrieve a subsequent second code segment $P_2$ from the buffer 308 at step 608.

Figure 7:
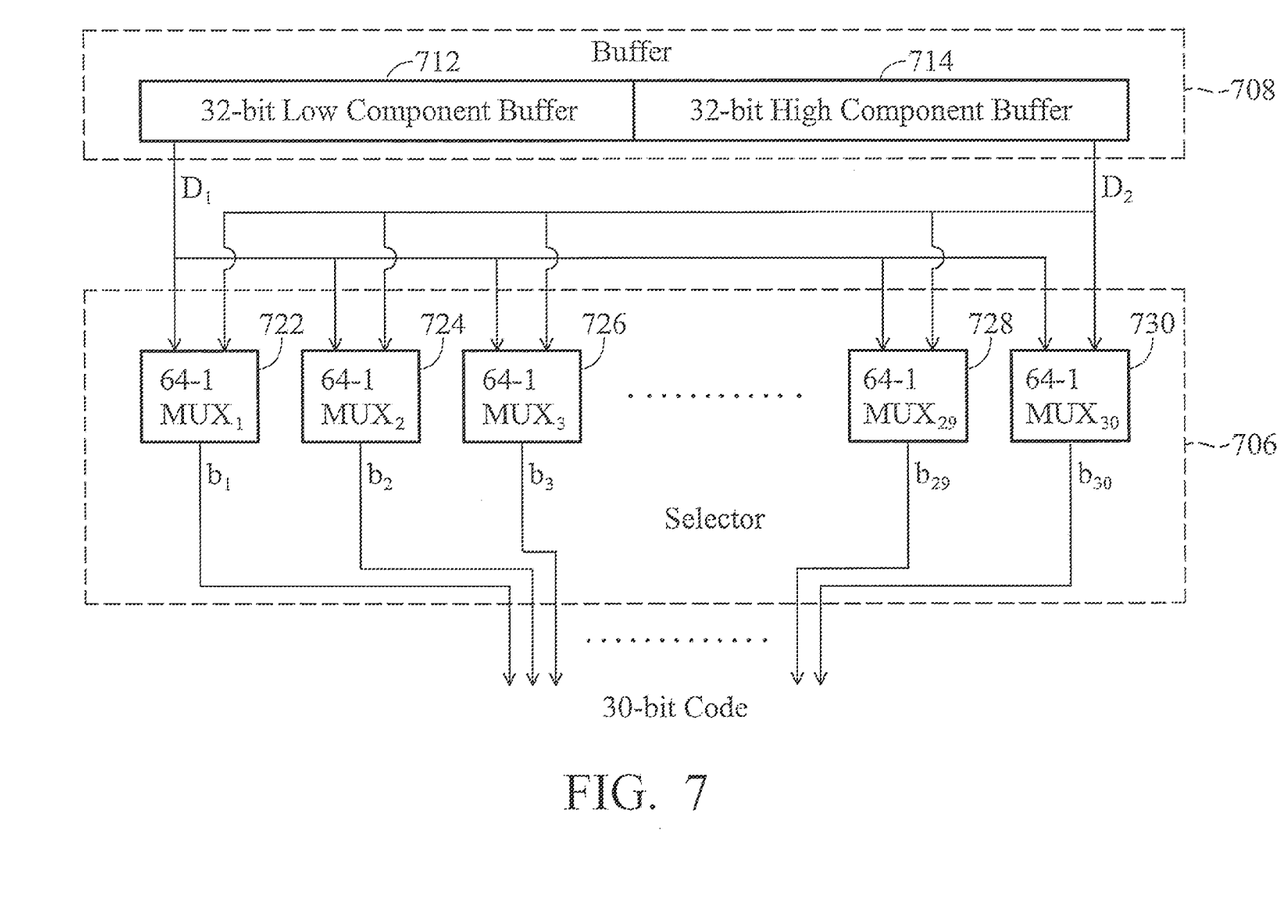
FIG. 7 is a block diagram of an embodiment of a selector according to the invention.

Referring to FIG. 7, a block diagram of an embodiment of a selector 706 according to the invention is shown. The selector 706 comprises a plurality of multiplexers 722~730. A buffer 708 comprises a low component buffer 712 storing a 32-bit code segment $D_1$ and a high component buffer 714 storing a 32-bit code segment $D_2$. Assume that a correlation data length of a correlator is 30 bits. The selector 706 therefore has a selecting window with a window size of 30 bits, and the number of the multiplexers 722~730 is equal to the window size of the selecting window. The multiplexers 722~730 receives code segments $D_1$ and $D_2$ stored in the component buffers 712 and 714. Each of the multiplexers 722~730 extracts one-bit code b1~b30 from the code segments selected by the selecting window, and the one-bit codes b1~b30 are gathered to form a code segment sent to the correlator.

Figure 8:
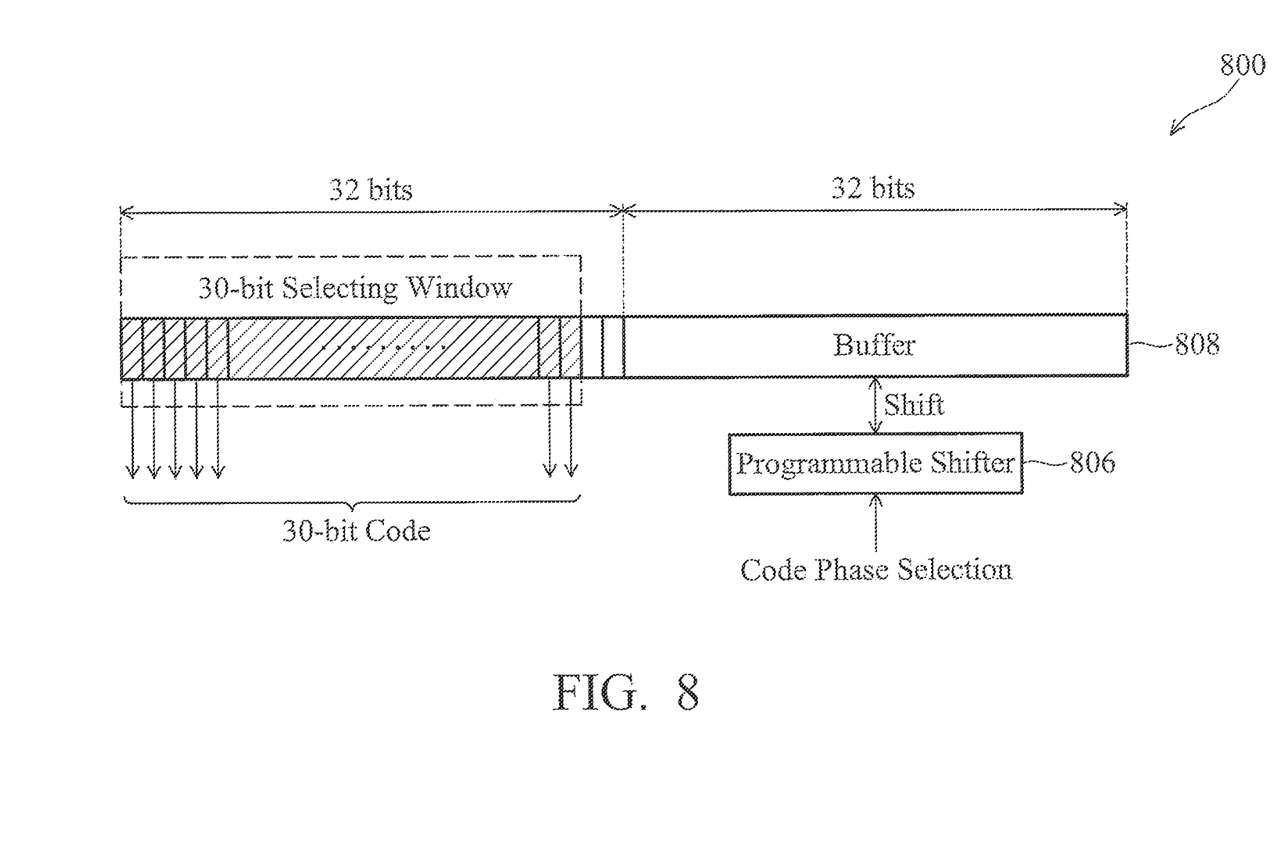
FIG. 8 shows an embodiment of a selector comprising a programmable shifter according to the invention.

Referring to FIG. 8, a schematic diagram of an embodiment of a selector 800 comprising a programmable shifter 806 according to the invention is shown. The programmable shifter 806 directly shifts the first code segments $P_1$ stored in a buffer 808 to a code phase according to a code phase selection signal. After the first code segments stored in the buffer 808 is shifted to a specific code phase, a selecting window, which is a fixed portion of the buffer 808, outputs data stored therein as the second code segment $P_2$. Thus, the code phase of the second code segment $P_2$ output to a correlator is a specific code phase required by the code phase selecting signal.

Figure 9A:
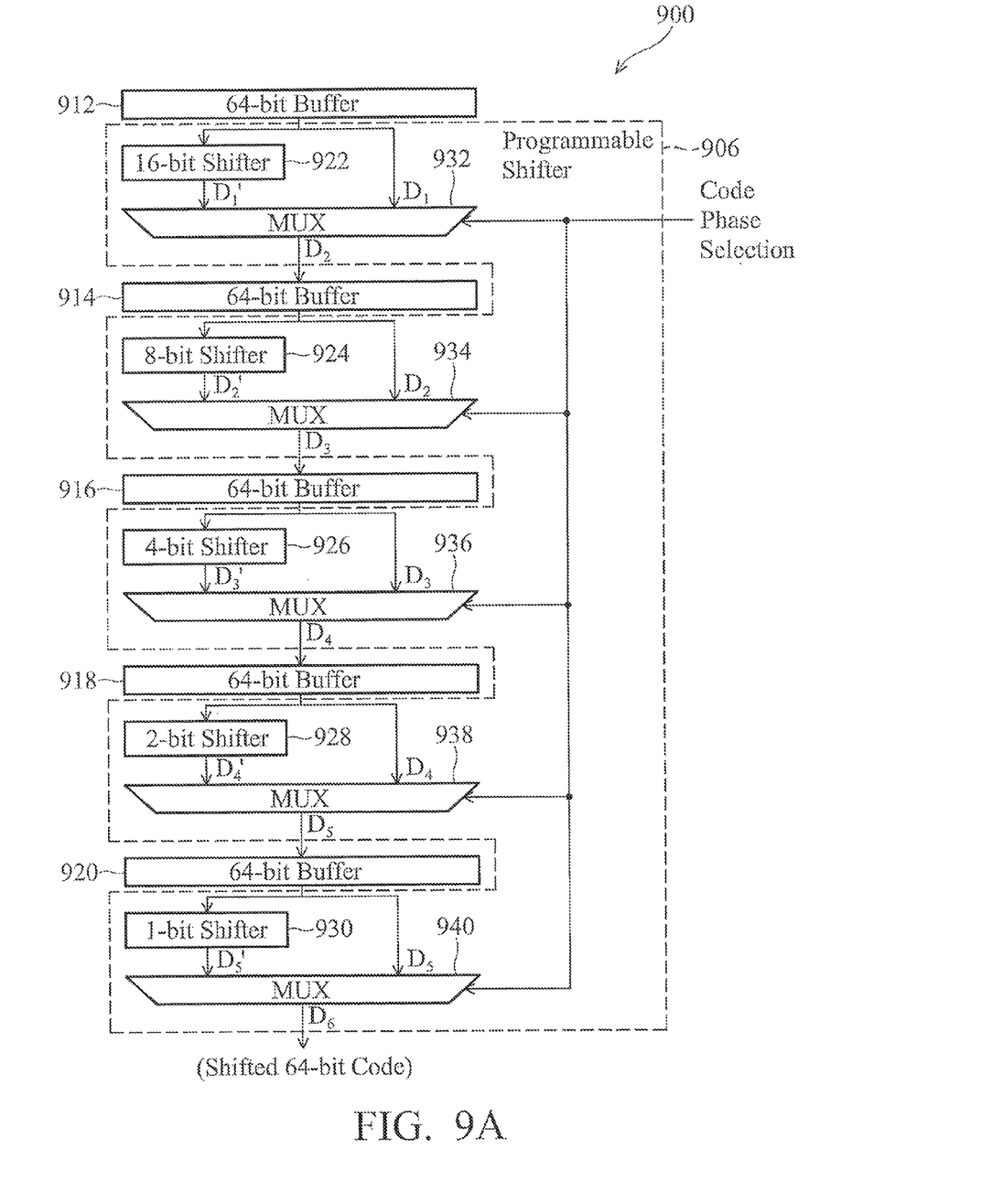
FIG. 9A is a block diagram of a programmable shifter changing a code phase of the code segment delivered to a correlator according to the invention.

Referring to FIG. 9A, a block diagram of a programmable shifter 900 changing a code phase of the code segment $P_2$ delivered to a correlator according to the invention is shown. Assume that component buffers of a buffer have a buffer size of $2^N$ bits. The programmable shifter 900 comprises N stages connected in series, and each stage comprises a shifter and a multiplexer. Each stage has a $2^{(N-n)}$-bit shifter to shift an input data of the stage by $2^{(N-n)}$ bits to obtain a shifted data, wherein n is an order of the stage in the series. The multiplexer of each stage then selects the shifted data or the input data of the current stage according to the code phase selection signal as an input data of a subsequent stage in the series.

Figure 9B:
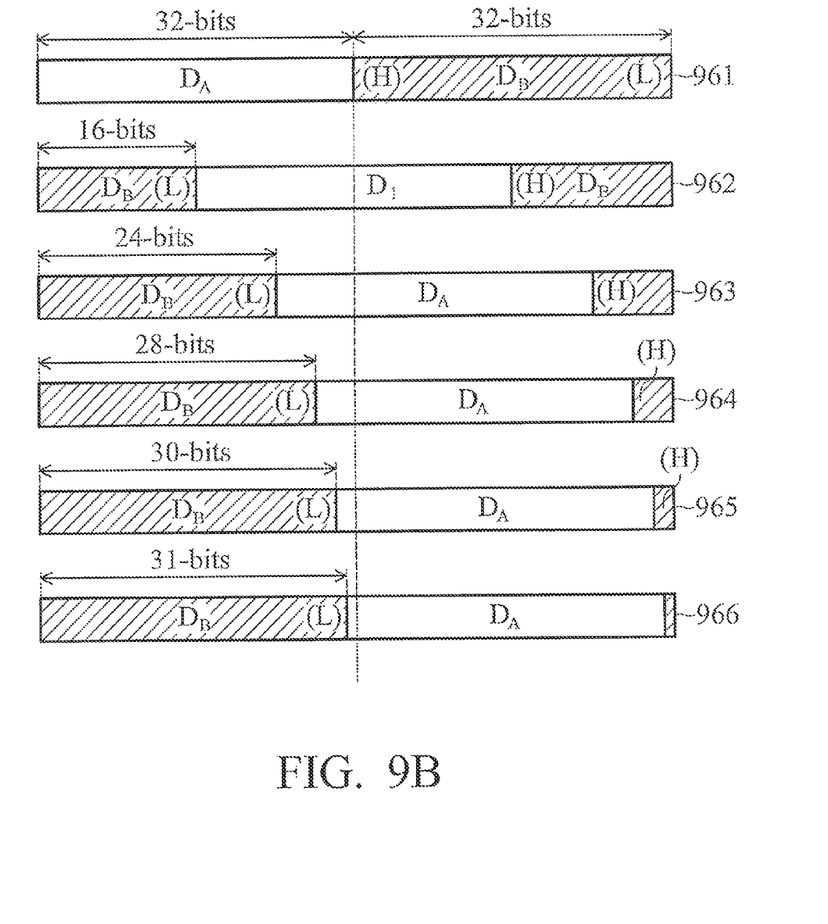
FIG. 9B is a schematic diagram showing a code segment shifted by a programmable shifter of FIG. 9A.

For example, the buffer 912 has two component buffers with a buffer size of 32 ($=2^5$) bits, and the programmable shifter 900 therefore has 5 stages. Referring to FIG. 9B, a schematic diagram showing a code segment shifted by a programmable shifter 900 of FIG. 9A is shown. The buffer 912 generates a 64-bit code segment $D_1$ as an input data of a first stage of the programmable shifter 900. The code segment 961 of FIG. 9B shows the original code segment $D_1$ stored in the buffer 912 prior to data shifting. The first stage has a 16-bit shifter 922 shifting the code segment $D_1$ by 16 bits to obtain a shifted code segment $D_1'$. The multiplexer 932 of the first stage then selects the shifted code segment $D_1'$ or the original code segment $D_1$ as an output $D_2$ of the first stage according to the code phase selection signal. The code segment 962 of FIG. 9B shows the output code segment $D_2$ if the shifted code segment $D_1'$ is selected by the code phase selection signal.

The output $D_2$ of the first stage is then stored in a buffer 914 and delivered to a second stage as an input data. The second stage, the third stage, the fourth stage, and the fifth stage of the programmable shifter 906 respectively have an 8-bit shifter 924, a 4-bit shifter 926, a 2-bit shifter 928, and a 1-bit shifter 930. Accordingly, after the shifters 924, 926, 928, and 930 shift the input code segments $D_2$, $D_3$, $D_4$, and $D_5$ to obtain shift code segments $D_2'$, $D_3'$, $D_4'$, and $D_5'$, the multiplexers 934, 936, 938, and 940 respectively selects the input code segments $D_2$, $D_3$, $D_4$, and $D_5$ or the shift code segments $D_2'$, $D_3'$, $D_4'$, and $D_5'$ according to the code phase selection signal as output code segments $D_3$, $D_4$, $D_5$, and $D_6$ thereof. The code segments 963, 964, 965, and 966 of FIG. 9B respectively show the output code segments $D_3$, $D_4$, $D_5$, and $D_6$ if the shifted code segments are selected by the code phase selection signal. The selector 800 then selects a portion of the final code segment $D_6$ as the code segment delivered to the correlator.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A Global Navigation Satellite System (GNSS) receiver, comprising:
    a buffer, receiving and storing a plurality of first code segments, wherein each of the first code segments is at least a portion of a memory code;
    a selector, coupled to the buffer, selecting a selecting window of the first code segments stored in the buffer as a second code segment according to a code phase selection signal; and
    a correlator, coupled to the selector, receiving the second code segment and calculating a correlation between a received GNSS signal and the second code segment, wherein the selector further determines a location of the selecting window according to the code phase selection signal.

2. The GNSS receiver as claimed in claim 1, wherein the selecting window is shifted according to the code phase selection signal every time after the second code segment is output to the correlator.

3. The GNSS receiver as claimed in claim 2, wherein the buffer checks whether the selecting window is shifted off one of the first code segments every time after the second code segment is output, sends a data request for a new first code segment when the selecting window is shifted off one of the first code segments, and updates the first code segment shifted off by the selecting window with the new first code segment received by the buffer.

4. The GNSS receiver as claimed in claim 1, wherein the correlation calculated by the correlator is a partial correlation.

5. The GNSS receiver as claimed in claim 1, wherein the code phase selection signal is controlled by a physical circuit or a software program.

6. The GNSS receiver as claimed in claim 1, wherein the selector comprises a plurality of multiplexers, coupled to the buffer, each extracting one-bit code from the first code segments selected by a selecting window as one-bit code of the second code segment, and the number of the multiplexers is equal to the correlation data length.

7. The GNSS receiver as claimed in claim 1, wherein the selector comprises a programmable shifter directly shifting the first code segments stored in the buffer to a code phase required by the code phase selection signal, and a fixed portion of the buffer, referred to as the selecting window, outputs data stored therein as the second code segment after the first code segments are shifted.

8. The GNSS receiver as claimed in claim 7, wherein the buffer comprises a plurality of component buffers with a buffer size of $2^N$ bits of the first data in total, the programmable shifter comprises N stages connected in series, and each stage comprises:

a shifter, receiving data output by a prior stage in the series as stage input data, shifting the stage input data by $2^{(N-n)}$ bits to obtain a shifted data, wherein n is an order of the current stage in the series; and a multiplexer, selecting the shifted data or the stage input data as an output data of the current stage;

wherein the first stage receives all the first code segments stored in the buffer as stage input data.

9. A method for memory code generation for a Global Navigation Satellite System (GNSS) receiver, comprising:

receiving at least a portion of a memory code as a first code segment;

storing a plurality of the first code segments into the buffer;

selecting a selecting window of the first code segments stored in the buffer as a second code segment according to the code phase selection signal; and calculating a correlation between a received GNSS signal and the second code segment, wherein the selecting step further comprising:

determining a location of the selecting window according to the code phase selection signal.

10. The method as claimed in claim 9, further comprising:

shifting the selecting window according to the code phase selection signal every time after the second code segment is output to the correlator.

11. The method as claimed in claim 10, further comprising:

checking whether the selecting window is shifted off one of the first code segments every time after the second code segment is output from the buffer;

sending a data request for a new first code segment when the selecting window is shifted off one of the first code segments; and updating the first code segment shifted off by the selecting window with the new first code segment received by the buffer.

12. The method as claimed in claim 9, wherein the correlation calculated by the correlator is a partial correlation.

13. The method as claimed in claim 9, wherein the code phase selection signal is controlled by a physical circuit or a software program.

* * * * *